Figure 3:
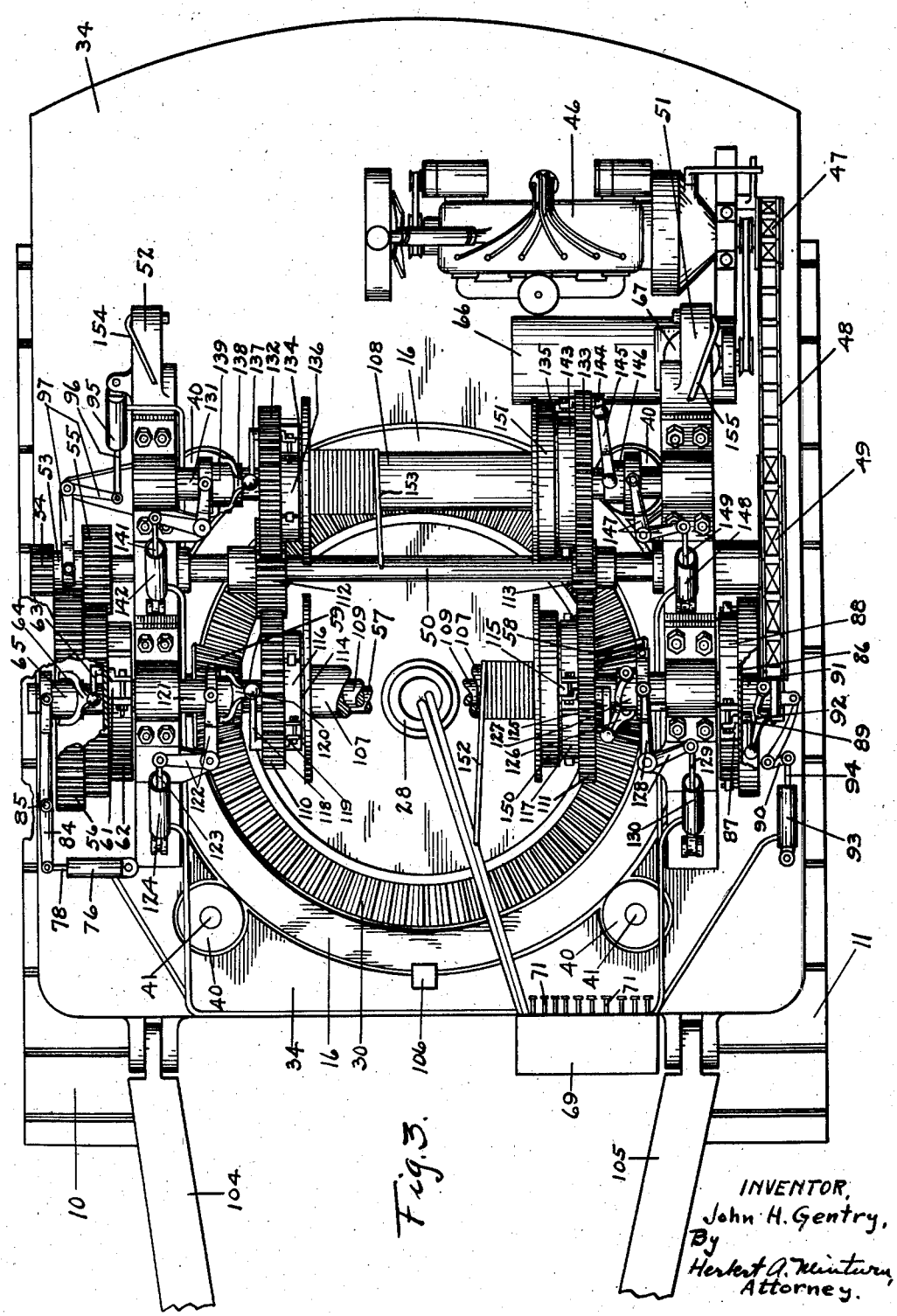

Nov. 28, 1944. J. H. GENTRY 2,363,860
POWER SHOVEL UNIT
Filed July 14, 1943 3 Sheets-Sheet 1
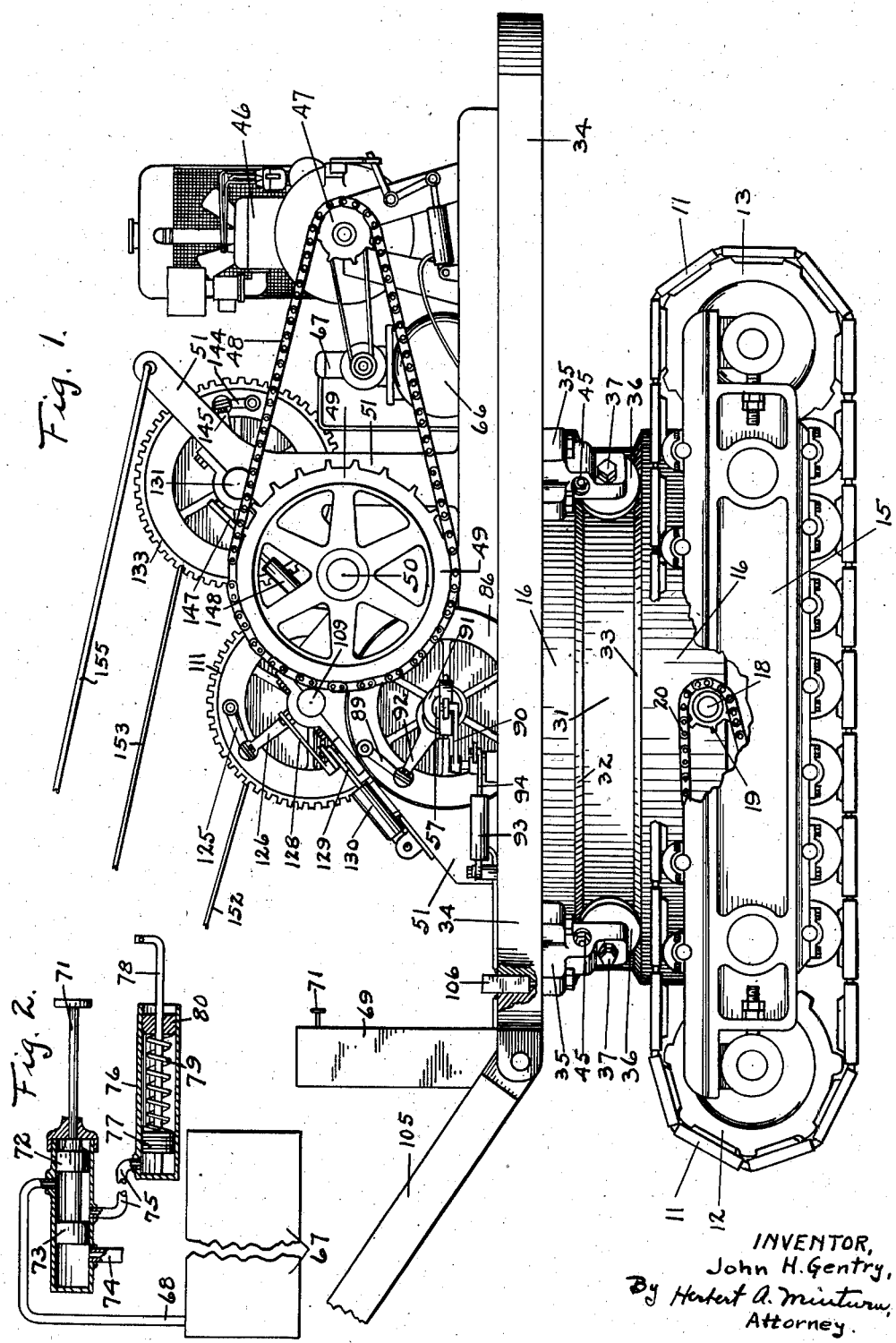
INVENTOR,
John H. Gentry,
By Herbert A. Minturn,
Attorney.

Nov. 28, 1944.  J. H. GENTRY  2,363,860
POWER SHOVEL UNIT
Filed July 14, 1943  3 Sheets-Sheet 2

INVENTOR,
John H. Gentry,
By
Herbert A. Minturn,
Attorney.

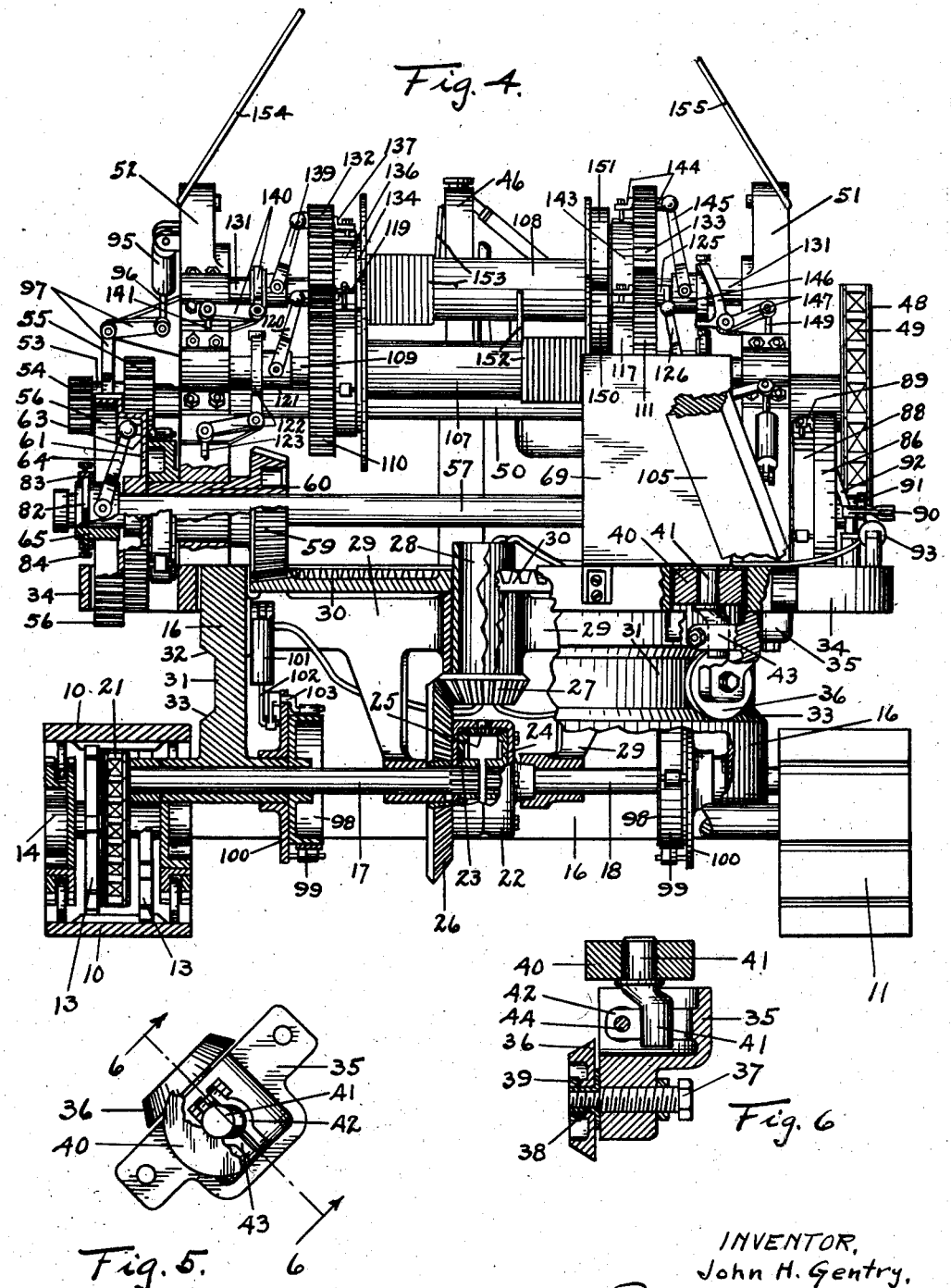

Patented Nov. 28, 1944

2,363,860

UNITED STATES PATENT OFFICE 2,363,860

POWER SHOVEL UNIT

John H. Gentry, near Greentown, Ind.; Eunice Ellen Gentry administratrix of said John H. Gentry, deceased Application July 14, 1943, Serial No. 494,665

8 Claims. (Cl. 212—69)

This invention relates to a power unit capable of being rigged for a push or pull shovel, drag line and bucket, crane, and for clam shell bucket operation. A primary object of the invention is to provide a power unit capable of locomotion under its own power and swingable about a pedestal in the absence of any center king-pin or the like.

Heretofore power units having a structure rotatable on the supporting base have employed a central pin about which the upper structure rotated and then in order to secure rotation, employed spur gears including a power driven pinion meshing with a gear around the supporting base. As above indicated, it is a primary purpose of the invention to eliminate that center pin and the spur gear drive, which parts, particularly the pin, were subjected to undue stress resulting in abnormal wear, resulting in frequent periods when the unit would be out of service for repair.

The structure embodying the present invention is extremely rugged and capable of being adjusted readily to take up wear, whereby an extremely long life free of frequent interruptions for repair is to be had. Other important objects and advantages of the invention are to be found in the new associations of the various elements entering into the structure and also are to be found in the control and power drive systems.

Additional advantages of the invention will become apparent to those versed in the art in the following description of one particular form of the invention as illustrated more or less diagrammatically in the accompanying drawings, in which Fig. 1 is a view in side elevation of a structure embodying the invention;

Fig. 2, a diagrammatic view illustrating the clutch control means;

Fig. 3, a view in top plan;

Fig. 4, a view in front elevation and partial section;

Fig. 5, a view in top plan of the front left-hand support roller and carrier; and Fig. 6, a view in vertical section on the line 6—6 in Fig. 5.

Like characters of reference indicate like parts throughout the several views in the drawings.

The invention is illustrated as a stripped unit, in that the cab or housing and the operator's platform are omitted in order to show the structural details more clearly. Referring to the drawings, a pair of track belts 10 and 11 are provided in the usual manner to extend around front and rear sprockets 12 and 13, Fig. 1, which in turn are carried by side frames 14 and 15. Carried by these side frames is a centrally positioned base cylinder 16. Diametrically extending across the lower end of the cylinder 16 are a pair of tread belt drive shafts 17 and 18 axially aligned, one shaft being provided to drive one tread belt in any suitable manner, such as through a sprocket 19 and chain 20, Fig. 1, the chain and sprocket being shown in relation to the outer shaft 18. In Fig. 4, the shaft 17 is illustrated as extending on out beyond the cylinder 16 to carry a chain 21 within the upper and lower sides of the tread belt 10 as the driving means therefor.

The inner ends of the shafts 17 and 18 are engaged within a differential unit 22 in the usual manner, Fig. 4, by drivingly engaging with side bevel gears 23 and 24 which are in turn interengaged by a bevel pinion gear 25 to set up the differential action. A driving gear 26, herein shown as being beveled, is secured to one side of the unit 22. This gear 26 is in constant mesh with the bevel gear 27 carried on the lower end of a hollow shaft 28. This shaft 28 extends vertically and upwardly axially of the cylinder 16 and is carried within a bore provided in a spider 29 provided to extend across the opening through the cylinder 16. This same spider 29 also affords means for supplying bearings to carry and hold in alignment the differential unit 22 and the two driving shafts 17 and 18.

On the upper end of the shaft 28 is fixed thereto a bevel gear 30 to rotate in a horizontal plane. This gear 30 is herein shown as having its outer periphery just clearing the inner wall of the cylinder 16.

The cylinder 16 is provided with a recessed portion 31 extending around its outer wall with upper and lower shoulders 32 and 33 respectively sloping upwardly and outwardly and downwardly and outwardly respectively. The lower shoulder 33 is provided to carry the downwardly exerted vertical load of the superstructure. The platform 34 is provided with a circular opening therethrough having a diameter slightly exceeding that of the outer face of the upper portion of the base cylinder 16 and this platform is positioned over the upper end of the cylinder 16 to have that end enter the platform hole.

A plurality of supporting roller brackets 35, herein shown as four in number, and best illustrated in detail in Figs. 4-6, is secured to the under side of the platform 34, each to position a roller 36 within the recess 31 to rest by a beveled periphery on the lower shoulder 33. The purpose of providing the sloping shoulder 33 and a beveled roller 36 is to provide for future adjustment to take up any wear that may arise after long periods of usage. As indicated in Fig. 6 particularly, a bolt 37 is screw-threadedly carried through a lower end portion of the bracket 35 to carry the roller 36 on its inner end whereby turning the bolt 37 from the outer face of the bracket will advance or retract the roller 36 over the shoulder 33. In the example herein shown in Fig. 6, the inner end of the bolt 37 is reduced in diameter to screw-threadedly engage within a bushing 38 to fix the bushing thereon against rotation in respect to the bolt, and this bushing extends through the roller 36 to have the collar 39 engage over the end of the bushing as a means for retaining the roller 36 rotatably about the bushing without any appreciable longitudinal movement therealong. A lock nut 45 about the bolt 37 is employed to secure the bolt 37 in any adjusted position. The diameter of the roller 36 is made to be such that when it is bearing by its under side against the shoulder 33, its upper side is in close proximity with the shoulder 32 so that any tendency for the platform 34 to tilt is thereby prevented by reason of the roller striking that upper shoulder 32 upon initial upward movement of the platform.

The roller 36 is further made to have a thickness which will cause the inner face of the roller to just clear the vertical cylindrical face of the recess 31. In order to keep the platform 34 centered in respect to the central axis of the shaft 28 and to keep the platform from rubbing against the upper end of the cylinder 16 as well as to keep the inner faces of the rollers 36 properly spaced outwardly in the recess 31, each of the brackets 35 further adjustably carries a spacing roller 40 to be in rolling contact with the outer face of the upper end of the cylinder 16. As indicated in Figs. 4–6, the roller 40 is carried on a spindle 41, the upper end of which has its axis offset from the axis of a lower portion that is frictionally gripped between the two jaws 42 and 43 that extend from an outer wall of the bracket 35 across a chamber provided therein, whereby the lower end of the spindle 41 may be gripped at any desired revolved position which is required to maintain the roller 40 in firm rolling contact with the cylinder 16. The two jaws 42 and 43 are pulled one toward the other to effect that gripping by means of a bolt 44 which may be reached for loosening and tightening through a suitable hole 45, Fig. 1, provided in the side wall of the bracket 35. Thus the bracket 35 in each instance not only carries the load carrying roller 36 but also carries the radial spacing roller 40, both rollers being adjustably mounted for wear take-up.

Any suitable power driving unit may, of course, be employed, the unit herein being shown as an engine 46 mounted transversely across the rear end of the platform 34 to have a driving sprocket 47. A chain 48 extends around the sprocket 47 and around a larger diameter driven sprocket 49 which is fixed on the outer end of the main drive shaft 50. This shaft 50 is rotatably supported transversely across the platform 34 and spaced thereabove by the spaced apart standards 51 and 52 respectively. The sprocket 49 is herein shown as being mounted on the left-hand end of the shaft 50 outside of the standard 51. The shaft 50 extends on through the standard 52 to extend therebeyond by a length sufficiently long to carry thereon a shiftable sleeve 53, the inner and outer ends of which carry respectively spur gears 54 and 55. The sleeve 53, while being shiftable longitudinally of the shaft 50, is fixed to be revolved therewith. A two-step gear 56 is fixed on the right-hand end of a shaft 57 outside of the standard 52. This shaft 57 is rotatably carried through the standards 51 and 52 in parallel alignment with the shaft 50. At the standards 51 and 52 are bevel pinion gears 58 and 59 respectively, both in constant mesh with the bevel gear 30. Each of these pinion gears 58 and 59 are provided, as shown in respect to the gear 59, Fig. 4, with a hub which extends as a sleeve 60 on through the respective standard, fitted to be free to turn in respect to the standard, and further, the shaft 57 extends axially through the sleeve 60 whereby that sleeve forms a bearing for the shaft 57 and permits each gear 58 and 59 to be revolved around the shaft independently one from the other.

Separate clutch means is provided, however, to selectively drive the gears 58 and 59 one at a time from the step gear 56 through the shaft 57. To drive the gear 59, for example, a clutch drum 61 is fixed to the sleeve 60 outside of the standard 52. The step gear 56 carries a contractable clutch band 62 around the periphery of the drum 61. This band 62 operates in the usual manner to afford means for interlocking in a driving manner the clutch drum 61 with the step gear 56. This operating means consists of a lever 63 carried by the step gear 56 to have a crank end interengage with one end of the band 62 as a means for pulling the band into frictional engagement with the drum 61. To rock this lever 63, a fork 64 has its upper end engaged with the outer end of the lever 63 and its lower end straddling a sleeve 65 and pivotally interconnected therewith. This sleeve 65 is carried on the shaft 57 to be longitudinally shiftable therealong on its outer end outside of the connection with the shaft of the step gear 56. By pushing the sleeve 65 inwardly toward the standard 52, the fork 64 is tended to be pushed to a vertically aligned position which will tend to push the lever 63 upwardly and cause a corresponding rocking of the crank end thereof which engages with the contractable band 62, and conversely when the sleeve 65 is shifted outwardly, the fork 64 is carried to an inclined position as shown in Fig. 4, to pull the lever 63 downwardly. Thus by suitable shifting of the sleeve 65, the band 62 may be caused to grip the drum 61 and thereby drivingly interconnect the gear 59 to cause it to turn with the step gear 56.

Any suitable means may be employed to shift the sleeve 65. The actuating means selected to be herein shown constitutes an hydraulic control. While any fluid may be employed in such a control, for simplicity in the present showing, the fluid will be indicated as air which is stored in a tank 66 by means of a compressor 67 suitably driven from the engine 46. From this supply tank 66, an air line 68 is carried up to an operator's control box 69 to interconnect with a plurality of control valves, each having an operating rod 71 extending from the box. The operating rod 71 in each instance interconnects with a balanced piston valve as shown in Fig. 2, wherein a pair of spaced apart pistons 72 and 73 are carried within a cylinder 74 to be slidably shifted therein by means of the interconnecting rod 71. The spacing of the pistons 72 and 73, the length of the cylinder 74, and the location of ports along the cylinder are proportioned to give the desired control upon shifting of the pistons within the cylinder. The air line 68 discharges into the cylinder 74 at a position adjacent the piston 72 when that piston is in its substantially outermost position, as shown in Fig. 2. An outlet line 75 leaves the cylinder 74 adjacent the piston 73 on that side opposing the piston 72 and runs to an operating cylinder 76. This operating cylinder 76 carries a piston 77 therein, to which is attached an operating rod 78. With the parts in the position shown in Fig. 2, air from the tank 66 is allowed to flow on through the control valve to enter the operating cylinder 76 behind the piston 77, tending to push it outwardly from the cylinder. A spring 79 surrounds the rod 78 to abut by its respective ends the piston 77 and a rod guide block 80 fixed in the cylinder 76 toward its outer end, this block 80 affording free escape of air around the rod 78 from the forward side of the piston 77. The spring 79 is of that design whereby it will permit the piston to travel toward the block 80 under the applied air pressure to perform the necessary control operation and then when the pressure is relieved behind the piston 77, the spring 79 will return the piston 77 to its normal initial position toward the inner end of the cylinder 76.

To permit the spring 79 to perform its operation of restoring the piston 77 to its initial position, the control valve is operated by pushing the rod 71 inwardly so as to cover over the port in the cylinder 74 of the air supply line 68 by the piston 72 and to carry the piston 73 on back of the port of an exhaust line 81. In other words, the ports of the feed line 75 and of the exhaust line 81 are then both between the pistons 72 and and 73 whereby air in the cylinder 76 may then flow back through the line 75 into the cylinder 74 and exhaust through the line 81, thereby relieving the pressure behind the piston 77 whereupon the spring 79 carries that piston 77 back to its position as indicated in Fig. 2.

Now referring again to the sleeve 65 which is carried on the shaft 57, the sleeve is provided with an annular ring 82 therearound, Fig. 4, and a collar 83 is engaged over this ring 82 in a manner to permit the ring 82 to revolve therewithin. Engaging this collar 83 is a lever 84 by means of a forked end whereby the collar is engaged at diametrically opposed positions by the ends of the legs of the fork. The lever 84 is pivoted at any suitable point 85, Fig. 3, and its forward free end is interengaged with the rod 78 extending from the cylinder 76 which in turn is rockably secured to the platform 34 at its closed end. Thus by travel of the rod 78 in the manner above described, the lever 84 may be rocked to slide the sleeve 65 along the shaft 57 to control the expansion and contraction of the band 62 on the drum 61.

In the same manner, the other bevel pinion gear 58 may be driven through the shaft 57. For controlling the drive of this gear 58, the shaft 57 carries on its left-hand end a disc 86 fixed to be driven by the shaft and the gear 58 carries a drum 87 drivingly engaged therewith outside of the standard 51. The disc 86 carries a contractable band 88 about the drum 87 to be operated by a lever 89 rockably carried by the disc 86 and extending therethrough with a crank arm to engage with one end of the band 88 as a means for tightening the band about the drum 87, all in the usual and well known manner. The lever 89 is rocked by another control cylinder 93, Fig. 3, having its rod 94 engaging with a bell crank 90 which shifts a sleeve 91 along the outer end of the shaft 57 to shift the forked rocker 92 toward and away from a vertical position, this rocker 92 having a forked end engaged with the sleeve 91 and an outer end engaged with the lever 89. It is to be understood that all of the control cylinders including the cylinder 93 and those hereinafter referred to, are duplicates, insofar as design is concerned, of the construction as shown in Fig. 2 as relating to the cylinder 76 and its internal parts.

In the description so far made, the structure provides for a drive from the engine 46 through the shaft 50 to the pair of gears 54 and 55 placed thereon. These gears may be selectively interengaged with the two gears of the step gear 56, depending upon the speed desired for the driven shaft 57. In the position shown in Fig. 3, the larger pinion gear 55 is shown to be in mesh with the smaller diameter gear of the step gear 56. To change the relative speed of the shaft 57 as compared to that of the shaft 50, the gear 54 would be shifted into mesh with the larger gear of the step gear 56 and the pinion gear 55 would be removed from its driving position. To control the shifting of these gears 54 and 55 through their interconnecting sleeve 53, a cylinder 95 is provided, herein shown as rockably carried along the side of the standard 52 to have its control rod 96 extend downwardly to engage with one arm of a bell crank 97, the other arm of which is pivotally connected to the sleeve 53 to permit rotation thereof and to permit shifting of the sleeve longitudinally of the shaft 50 by rocking of the bell crank. This control cylinder 95, as well as the previously mentioned control cylinder 93, interconnects with a corresponding control valve in the control box 69 to be operated by one of the valve rods 71 in the manner described in reference to the structure shown in Fig. 2.

Now with the engine 46 in operation, by selective operation of the cylinders 76, 93 and 95, the main bevel gear 30 may be caused to turn in either a clockwise or counterclockwise direction and at one of two speeds in either direction. The two-directional drive is secured by the operation of the one pinion bevel gear 59 or the other bevel pinion gear 58. Thus through the main bevel pinion gear 30, shaft 28, and the pinion gear 27 thereon, the differential bevel gear 26 may be turned to set the differential unit 22 into operation. This operation would cause both tread belts 10 and 11 to be set in motion whereby the entire unit may start travelling. The direction of travel would then be determined by which one of the upper bevel gears 58 and 59 were being driven.

In order to steer the unit when travelling, one or the other of the drive shafts 17 and 18 is braked or held stationary to permit relative travel between the shafts 17 and 18 through the differential unit 22. To effect such travel, each shaft 17 and 18 has fixed thereto a clutch drum 98 encircled by a contractable clutch band 99 in turn carried by a disc 100 fixed in a stationary manner to the base cylinder 16. The clutch band 99 in each instance is operated in the same manner as the bands previously described, for example, as shown in Fig. 4, by a cylinder 101 having its operating rod 102 connecting with the band shifting lever 103. The air supply to the cylinder 101 is controlled through operation of one of the push rods 71 at the control box 69.

The platform 34 has rockably attached thereto at its forward edge any suitable type of boom. In the form herein shown, the boom is indicated as having the two separate leg ends 104 and 105 attached to the platform. In order to cause the boom to travel in horizontal directions, the platform 34 is power driven to turn in either a clockwise or counterclockwise direction. To effect the relative travel between the platform 34 and the supporting base cylinder 16, the clutch band 99 on each of the respective drums of the axles 17 and 18 are drawn up snugly into clutched conditions so as to hold the cylinder 16 stationary in regard to travel over the ground. In this condition, the gear 30 cannot revolve so that by counterthrust, the platform itself will start turning when either gear 58 or 59 is operated. Again as above indicated, the turning of the platform 34 through either gear 58 or 59 may be had at one of two speeds depending upon the shifted positions of the pinion gears 54 and 55. It is to be seen that when the platform 34 is to be turned in one direction, one gear 59 will be in operation on one side of the gear 30, whereas when the platform 34 is to be turned in the opposite direction, the other gear, such as 58, would be operating on the other side of the gear 30. In other words, all of the wear between the teeth of those two drive gears 58 and 59 and the main gear 30 would be divided as between the two drive gears.

In further reference to the driving of the tread belts 10 and 11, to prevent tendency of the platform 34 to revolve about the base cylinder 16 during that drive, the platform 34 and the cylinder 16 are preferably interlocked by any suitable means. One such means is herein shown as by a pin 106, Figs. 1 and 3, which is simply dropped down into a recess half formed in the forward side of the cylinder 16 and half formed in the platform 34. This pin 106, of course, would be removed when there is to be relative travel between the platform 34 and the cylinder 16.

In the unit herein shown, two cable winding spools 107 and 108 are provided. The forward spool 107 is mounted directly above the shaft 57 to be revolubly carried on a shaft 109 that is mounted on the standards 51 and 52. Revolubly mounted on the shaft 109 is a gear 110 at the right end of the spool 107, and also revolubly mounted on the shaft 109 is a second gear 111 outside of the left end of the spool 107. Both of these gears 110 and 111 are in mesh with respective pinion gears 112 and 113 fixed to the drive shaft 50. The gears 110 and 111 are of different diameters whereby there is a relative difference in speed between two gears as driven from the shaft 50.

The spool 107 carries clutch drums 114 and 115 respectively on its outer ends, each drum being encircled by a clutch band 116 and 117 respectively. These bands 116 and 117 are respectively carried to revolve with the gears 110 and 111. The band 116 is operated by the lever 118 rockably carried by the gear 110 having the band control crank arm 119 attached to one end of the band 116. The lever 118 is operated through the rocker 120 attached thereto by its upper end and pivotally secured by its lower end to a sleeve 121 that is longitudinally shiftable along the shaft 109. The sleeve 121 is shifted by means of a bell crank 122 having one arm engaged therewith and the other arm engaged with the rod 123 of the cylinder 124. In like manner the band 117 is engaged and disengaged with and from the drum 115 through the band lever 125 shifted by the rocker 126, in turn secured to the sleeve 127 that is shifted by the bell crank 128, by the rod 129 operated by the cylinder 130. By this clutching arrangement, the spool 107 may be selectively driven at one of two speeds from the shaft 50 or may be disengaged entirely from any driving control.

In practice the spool 107 would carry a braking device on the drum 150 fixed to the left-hand end of the spool. The structure for operating this brake does not constitute a part of the invention per se and the showing thereof is omitted since the structure follows standard practice and the showing thereof would only complicate and obscure the essential features of the invention. This braking device would be employed in the usual manner to retain this spool 107 in any desired position.

The spool 108 is revolubly mounted on a shaft 131 carried behind and above the shaft 109 by the standards 51 and 52. Revolubly mounted on this shaft 131 at respective ends of the spool 108 are gears 132 and 133 in constant mesh with the spur gears 112 and 113 that are fixed on the shaft 50. These gears 132 and 133 are of different diameters to mesh properly with the large diameter spur gear 112 and the small diameter spur gear 113, the shaft 131 being parallel with the shaft 50. On each end of the spool 108 is mounted a clutch drum 134 and 135 respectively between the spool ends and the gears 132 and 133. Surrounding the drum 134 is a clutch band 136 that is operated by the lever 137 rockably carried by the gear 132, the band 136 being also mounted to revolve with the gear. To operate the lever 137, a rocker 138 is attached thereto by an upper end and by its lower end straddles the sleeve 139 to be pivotally connected thereto. This sleeve 139 is shiftable longitudinally of the shaft 131 by means of a yoke engaging therewith as a part of the crank 140 operated by the rod 141 extending from the operating cylinder 142. A clutch band 143 carried by the gear 133 to revolve therewith surrounds the clutch drum 135 at the other end of the spool 108 and is controlled by the lever 144 carried by the gear 133 and in turn rocked by the rocker 145 secured thereto by its upper end and engaging a sleeve 146 by its lower end. The sleeve 146 is shiftable along the shaft 131 by means of the bell crank 147 operated by the control cylinder 148 through the rod 149.

The spool 108 is also provided with a braking drum 151 whereby a brake may be applied thereto to retain the spool 108 in any desired position when both of the clutch bands 136 and 143 are released. The brake structure does not form a part of the invention per se and is omitted since it follows the usual and well known practice.

The spools 107 and 107 carry respectively cables 152 and 153 which extend to suitable rigging on the boom in the usual and well known manner. Additional cables 154 and 155 for guying the boom are herein shown as attached to rear ends of the standards 51 and 52.

The operator may stand at the control box 69 and operate selectively any one of the various control cylinders above described to effect that operation he may desire including the selective winding or unwinding of either one or both of the cables 152 and 153, and at one of two speeds; turning the table 34 in either direction at one of two speeds; or moving the unit forward or rearwardly through operations of the tread belts 10 and 11. By means of the structure above described, the platform 34 and all of the mechanism mounted thereon is supported on the base cylinder 16 independently of use of any center king-pin and, further, the turning of the table is had through use of not one but two gears depending upon the direction of travel desired. The power unit is subjected to severe sudden stresses as are set up when a dip bucket, for example, is quickly forced into a bank in which boulders are found and the bucket is attempted to be lifted on up through the bank in the loading operation and a boulder is struck. The stresses set up under such a condition are distributed in the structure of the present invention over a number of bearing points and are not concentrated upon a single king-pin. Furthermore the platform load carrying members are located outside of the supporting base where they may be readily inspected, greased, adjusted, and overhauled or replaced as the occasion may arise.

While the invention has herein been shown in the one particular form in more or less detail, it is obvious that structural variations may be employed, such as in the particular clutch designs, clutch controls, and individual forms and shapes of the various elements, all without departing from the spirit of the invention and it is therefore intended that the invention not be limited to that precise form beyond the limitations as may be imposed by the following claims.

I claim:

1. A power unit comprising the combination of a base having an upper cylindrical portion; a track carried by said cylindrical portion; a platform; a plurality of rotatable members bearing on said track to roll therealong; means supporting said platform on said rotatable members whereby the platform may be revolved about the axis of said portion; a power source mounted on said platform; a primary gear having its axis coinciding with the axis of said cylindrical portion; a pinion gear driven by said power source and meshed with said primary gear; said primary gear being mounted on said base to be rotatable in respect to both said platform and said portion; a pair of traction members, one on each side of said base; a pair of drive members carried by the base, one connecting with each traction member; drive means between said primary gear and said drive members; whereby locomotion of the unit may be had through said primary gear; and means selectively holding said drive members individually or simultaneously against rotation.

2. A power unit comprising the combination of a base having an upper cylindrical portion; a track carried by said cylindrical portion; a platform; a plurality of rotatable members bearing on said track to roll therealong; means supporting said platform on said rotatable members whereby the platform may be revolved about the axis of said portion; a power source mounted on said platform; a primary gear having its axis coinciding with the axis of said cylindrical portion; and a pinion gear driven by said power source and meshed with said primary gear; said primary gear being mounted on said base to be rotatable in respect to both said platform and said portion; a pair of traction members, one on each side of said base; a pair of drive members carried by the base, one connecting with each traction member; and drive means between said primary gear and said drive members; whereby locomotion of the unit may be had through said primary gear; and a second pinion gear meshing with said primary gear diametrically positioned from said first pinion gear; both of said pinion gears being revolubly mounted on a common shaft mounted on said platform substantially normally of the axis of said primary gear; a main drive shaft driven by said power source and driving said pinion gear shaft; and a clutch for each of said pinion gears selectively operated to connect drivingly said pinion gears with said pinion gear shaft whereby said primary gear may be turned selectively by either pinion gear in opposite directions.

3. A power unit comprising the combination of a base having an upper cylindrical portion; a track carried by said cylindrical portion; a platform; a plurality of rotatable members bearing on said track to roll therealong; means supporting said platform on said rotatable members whereby the platform may be revolved about the axis of said portion; a power source mounted on said platform; a primary gear having its axis coinciding with the axis of said cylindrical portion; and a pinion gear driven by said power source and meshed with said primary gear; said primary gear being mounted on said base to be rotatable in respect to both said platform and said portion; a pair of traction members, one on each side of said base; a pair of drive members carried by the base, one connecting with each traction member; and drive means between said primary gear and said drive members; whereby locomotion of the unit may be had through said primary gear; and a second pinion gear meshing with said primary gear diametrically positioned from said first pinion gear; both of said pinion gears being revolubly mounted on a common shaft mounted on said platform substantially normally of the axis of said primary gear; a main drive shaft driven by said power source and driving said pinion gear shaft; and a clutch for each of said pinion gears selectively operated to connect drivingly said pinion gears with said pinion gear shaft whereby said primary gear may be turned selectively by either pinion gear in opposite directions; said traction member driving members being interconnected by differential means; a brake for each of the driving members; and means selectively operating the brakes simultaneously or one independently of the other.

4. A power unit comprising the combination of a base having an upper cylindrical portion; a track carried by said cylindrical portion; a platform; a plurality of rotatable members bearing on said track to roll therealong; means supporting said platform on said rotatable members whereby the platform may be revolved about the axis of said portion; a power source mounted on said platform; a primary gear having its axis coinciding with the axis of said cylindrical portion; and a pinion gear driven by said power source and meshed with said primary gear; said primary gear being mounted on said base to be rotatable in respect to both said platform and said portion; a pair of traction members, one on each side of said base; a pair of drive members carried by the base, one connecting with each traction member; and drive means between said primary gear and said drive members; whereby locomotion of the unit may be had through said primary gear; and a second pinion gear meshing with said primary gear diametrically positioned from said first pinion gear; both of said pinion gears being revolubly mounted on a common shaft mounted on said platform substantially normally of the axis of said primary gear; a main drive shaft driven by said power source and driving said pinion gear shaft; and a clutch for each of said pinion gears selectively operated to connect drivingly said pinion gears with said pinion gear shaft whereby said primary gear may be turned selectively by either pinion gear in opposite directions; said traction member driving members being interconnected by differential means; a brake for each of the driving members; and means selectively operating the brakes simultaneously or one independently of the other; and means interlocking said platform and said base when said traction members are to be operated.

5. A power unit comprising the combination of a base having an upper cylindrical portion; a track carried by said cylindrical portion; a platform; a plurality of rotatable members bearing on said track to roll therealong; means supporting said platform on said rotatable members whereby the platform may be revolved about the axis of said portion; a power source mounted on said platform; a primary gear having its axis coinciding with the axis of said cylindrical portion; and a pinion gear driven by said power source and meshed with said primary gear; said primary gear being mounted on said base to be rotatable in respect to both said platform and said portion; a pair of traction members, one on each side of said base; a pair of drive members carried by the base, one connecting with each traction member; and drive means between said primary gear and said drive members; whereby locomotion of the unit may be had through said primary gear; and a second pinion gear meshing with said primary gear diametrically positioned from said first pinion gear; both of said pinion gears being revolubly mounted on a common shaft mounted on said platform substantially normally of the axis of said primary gear; a main drive shaft driven by said power source and driving said pinion gear shaft; and a clutch for each of said pinion gears selectively operated to connect drivingly said pinion gears with said pinion gear shaft whereby said primary gear may be turned selectively by either pinion gear in opposite directions; said traction member driving members being interconnected by differential means; a brake for each of the driving members; and means selectively operating the brakes simultaneously or one independently of the other; said drive means between said primary gear and said driving members comprising a shaft axially aligned and drivingly connected with said primary gear, a gear on said shaft, a gear fixed to said differential means and meshed with said shaft gear, all within said base.

6. A power unit comprising the combination of a base having an upper cylindrical portion; a track carried by said cylindrical portion; a platform; a plurality of rotatable members bearing on said track to roll therealong; means supporting said platform on said rotatable members whereby the platform may be revolved about the axis of said portion; a power source mounted on said platform; a primary gear having its axis coinciding with the axis of said cylindrical portion; and a pinion gear driven by said power source and meshed with said primary gear; said primary gear being mounted on said base to be rotatable in respect to both said platform and said portion; a pair of traction members, one on each side of said base; a pair of drive members carried by the base, one connecting with each traction member; and drive means between said primary gear and said drive members; whereby locomotion of the unit may be had through said primary gear; and a second pinion gear meshing with said primary gear diametrically positioned from said first pinion gear; both of said pinion gears being revolubly mounted on a common shaft mounted on said platform substantially normally of the axis of said primary gear; a main drive shaft driven by said power source and driving said pinion gear shaft; and a clutch for each of said pinion gears selectively operated to connect drivingly said pinion gears with said pinion gear shaft whereby said primary gear may be turned selectively by either pinion gear in opposite directions; a pair of shafts disposed across said platform in alignment with said main drive shaft; gears revolubly carried by said pair of shafts; gear means fixed to said main drive shaft in constant mesh with the gears on said pair of shafts; cable winding drums revolubly carried on said pair of shafts; and clutch means selectively interengaging said pair of shaft gears with their respective shafts.

7. A power shovel unit comprising a base member having a cylindrical portion and having a track extending annularly around said portion; a plurality of rollers carried by said track; a platform; a plurality of brackets, one each carrying one of said rollers and each bracket being secured to said platform whereby the platform is supported through said rollers on said base; and radial thrust rollers between said platform and said base portion; a main gear revolubly carried by said base portion; a train of gears between said power source and said main gear; traction members supporting said base; a power drive between said main gear and said traction members; and means for selectively holding said main gear against revolution in respect to said base to permit revolution of said platform in respect to said base and to prevent operation of said traction members.

8. A power shovel unit comprising a base member having a cylindrical portion and having a track extending annularly around said portion; a plurality of rollers carried by said track; a platform; a plurality of brackets, one each carrying one of said rollers and each bracket being secured to said platform whereby the platform is supported through said rollers on said base; and radial thrust rollers between said platform and said base portion; a main gear revolubly carried by said base portion; a train of gears between said power source and said main gear; traction members supporting said base; a power drive between said main gear and said traction members; and means for selectively holding said main gear against revolution in respect to said base to permit revolution of said platform in respect to said base and to prevent operation of said traction members; and means for fixing said platform in position relative to said base when said traction members are to be operated by revolution of said main gear.

JOHN H. GENTRY.